United States Patent [19]

Stephens, Jr.

[11] Patent Number: 5,869,018

[45] Date of Patent: Feb. 9, 1999

[54] TWO STEP PROCESS FOR THE PRODUCTION OF IRON CARBIDE FROM IRON OXIDE

[75] Inventor: Frank M. Stephens, Jr., Lakewood, Colo.

[73] Assignee: Iron Carbide Holdings, Ltd., Lakewood, Colo.

[21] Appl. No.: 181,997

[22] Filed: Jan. 14, 1994

[51] Int. Cl.$^6$ ..................................................... C01B 31/30
[52] U.S. Cl. .......................................... 423/439; 423/440
[58] Field of Search ..................................... 423/439, 440

[56] References Cited

U.S. PATENT DOCUMENTS

| Re. 32,247 | 9/1986 | Stephens, Jr. ............................... | 75/11 |
|---|---|---|---|
| 2,535,042 | 12/1950 | Cohn et al. ................................. | 23/208 |
| 2,780,537 | 2/1957 | Stelling et al. ............................. | 75/26 |
| 3,764,123 | 10/1973 | Beggs et al. ................................ | 266/29 |
| 4,396,423 | 8/1983 | Stephens, Jr. et al. ...................... | 75/25 |
| 4,398,945 | 8/1983 | Stephens, Jr. ............................... | 75/11 |
| 4,668,414 | 5/1987 | Okamura et al. .................... | 252/62.51 |
| 4,842,759 | 6/1989 | Okamura et al. .................... | 252/62.51 |
| 4,931,198 | 6/1990 | Arase et al. ......................... | 252/62.51 |
| 5,026,605 | 6/1991 | Kitamura et al. ....................... | 428/403 |
| 5,073,194 | 12/1991 | Stephens et al. .......................... | 75/376 |
| 5,104,561 | 4/1992 | Kitamura et al. .................... | 252/62.51 |
| 5,118,479 | 6/1992 | Stephens, Jr. et al. ................. | 423/148 |
| 5,137,566 | 8/1992 | Stephens, Jr. et al. ................... | 75/507 |
| 5,151,206 | 9/1992 | Okamura et al. .................... | 252/62.51 |
| 5,205,950 | 4/1993 | Shibuya et al. ..................... | 252/62.51 |

*Primary Examiner*—Michael Lewis
*Assistant Examiner*—Stuart L. Hendrickson
*Attorney, Agent, or Firm*—Sheridan Ross P.C.

[57] ABSTRACT

The present in a process for the conversion of iron-containing material into iron carbide. The process includes a first step in which the iron-containing material is contacted with a reducing gas that contains no more than a small amount of reactive carbon to produce metallic iron and a second step in which the metallic iron is contacted with a reducing and carburizing gas to produce iron carbide.

The reducing and carburizing gas includes reactive carbon, hydrogen, and methane. The iron carbide product is of high purity.

39 Claims, 4 Drawing Sheets

TWO STEP PROCESS FOR THE PRODUCTION OF IRON CARBIDE FROM IRON OXIDE

FIELD OF THE INVENTION

The present invention relates to a method for producing iron carbide from an iron-containing feed material. More specifically, the present invention utilizes a two step process to convert iron oxide to metallic iron in the first step and metallic iron to iron carbide in the second step for use in steel-making.

BACKGROUND OF THE INVENTION

The steel industry has relied on a process that has been in use for many years for the conversion of iron ore into steel. The process converts iron ore into pig iron in a blast furnace using coke produced in a coke oven. The process next converts the pig iron or hot metal into steel in an open hearth or basic oxygen furnace.

In recent years, federal and local environmental regulations have caused numerous problems for steel producers using this steel-making process. The blast furnace and coke ovens used in the process are not only energy intensive but also responsible for most environmentally damaging emissions by steel producers. To redesign or modify blast furnaces and coke ovens to comply with pollution standards is expensive. The expense would cause the cost of steel produced by the conventional steel-making process to be non-competitive with steel produced by foreign competitors.

To address these problems, a process was developed for steel production that eliminates the blast furnace and coke oven in the steel-making process. In the process, a bed of iron oxide is fluidized by a single, multiple-component gas stream and directly converted into an iron carbide-containing product, primarily consisting of $Fe_3C$. The iron carbide is then added to a basic oxygen or electric arc furnace to produce steel. In the process, reduction and carburization reactions occur together in the same fluidized bed.

Another process has been applied to produce acicular iron carbides having desired magnetic characteristics for use in magnetic recording and as catalysts for converting CO and $H_2$ into lower aliphatic hydrocarbons. In the process, a bed of the acicular iron oxide is reduced by one gas and a bed of the reduced product is then carburized by another gas to produce acicular iron carbides. The process suffers from slow reaction kinetics and large amounts of impurities (including iron oxide, free carbon and metallic iron) in the acicular iron carbide product.

Other techniques to convert an iron-containing feed material into an iron carbide-containing product are batch processes, require expensive components and/or otherwise raise other operational complications.

It would be advantageous to provide a continuous process to convert iron-containing materials into iron carbide. It would be further advantageous to produce an iron carbide product with environmentally friendly and/or non-hazardous byproducts. It would be a further advantage to optimize the reaction kinetics of chemical reactions to convert iron-containing materials into iron carbide and to produce an iron carbide product that has high purity.

Additionally, it would be advantageous to develop an environmentally friendly, energy efficient and inexpensive process to produce steel. It would be further advantageous to convert, inexpensively and efficiently, iron-containing materials into iron carbide for use in the production of steel. It would be a further advantage to eliminate the blast furnace and coke oven from the steel-making process.

SUMMARY OF THE INVENTION

In accordance with an embodiment of the present invention, a two step process for producing iron carbide is provided. In the first step, a first feed material containing iron is contacted with a first gas to produce a first product containing metallic iron. The first gas contains hydrogen. The hydrogen in the first gas can be hydrogen gas, a hydrogen gas precursor, or mixtures thereof.

The first product contains no more than about 49 percent by weight iron carbide. To yield this result, the first gas contains no more than a predetermined amount of reactive carbon. As used herein, "reactive carbon" refers to any carbon-containing compound capable of providing carbon to carburize metallic iron at the temperature, pressure and composition of the reactor atmosphere. For example, reactive carbon can include carbon monoxide, carbon dioxide, and mixtures thereof. Carburization of the first feed material is undesired as it reduces the rate at which the iron oxide is reduced to metallic iron.

It is preferred that iron oxide be at least about 90 mole percent of the feed material in the first step on a water free basis. Preferably a substantial portion, and more preferably a majority, of the iron oxide in the first feed material is converted to metallic iron in the first step. The presence of iron oxides in the first product is not desired since iron oxide will slow the reaction kinetics and lengthen the residence time in the second step.

In a second step, the first product is contacted with a second gas to produce a second product containing iron carbide. To produce a second product containing iron carbide, the second gas includes (a) a first component containing carbon monoxide or a carbon monoxide precursor, carbon dioxide or a carbon dioxide precursor, or mixtures thereof and (b) a second component containing hydrogen gas or a hydrogen gas precursor. The second gas can also include a third component containing methane or a methane precursor. The second product can be fed directly to an appropriate reactor for conversion into steel.

A majority of the second product is preferably iron carbide. It is desired that at least about 90 mole percent, and more preferably 95 mole percent of the iron carbide be in the form of $Fe_3C$. $Fe_2C$ is not desired as it, unlike $Fe_3C$, is highly reactive and will oxidize upon exposure to air. The second product should contain no more than about 6 to about 8 mole percent impurities, including metallic iron, free carbon, and iron oxide. Impurities such as metallic iron, free carbon, and iron oxide can cause problems if the second product is converted into steel and the steel processed into useful articles.

In the second gas, the first component is preferably carbon monoxide or a carbon monoxide precursor, carbon dioxide or a carbon dioxide precursor, or mixtures thereof. The first component should be the primary source of carbon in the conversion of metallic iron into iron carbide. Although the methane or methane precursor in the third component contains carbon, the preferred sources of carbon for the carburization of the metallic iron are carbon monoxide or a carbon monoxide precursor, carbon dioxide or a carbon dioxide precursor, or mixtures thereof. Water and not hydrogen gas will be a byproduct of carburization using the preferred compounds.

In the second component, water vapor, a hydrogen gas precursor limits substantially the decomposition of carbon monoxide into free carbon and thereby substantially eliminates free carbon from the second product.

The third component, methane, a methane precursor, or mixtures thereof, prevents hydrogen from reacting with the carbon in iron carbide, a reaction which would convert iron carbide into metallic iron. Metallic iron in the second product can oxidize to form iron oxides which create difficulties in converting the second product into steel.

In one embodiment of the present invention, the process is a continuous process. Preferably, the two process steps are conducted in separate reaction zones to facilitate the continuity of the process. Preferably, in one or both process steps the reaction zone is a fluidized bed.

The present invention has numerous advantages over existing methods and apparatuses. One embodiment of the present invention advantageously provides a continuous process to convert the iron-containing materials into iron carbide. The present invention thereby avoids the increase in operating expenses associated with batch processes.

Another embodiment of the present invention advantageously provides a process with rapid reaction kinetics. The composition of each gas can be selected to optimize the kinetics of the reaction in each process step. The reaction conditions, such as pressure, temperature, and time, can also be selected to optimize the kinetics of each reaction.

Another embodiment of the present invention advantageously provides a process that produces an iron carbide product of high purity. The iron carbide product is substantially free of impurities, including free carbon, iron oxide, and metallic iron.

Another embodiment of the present invention advantageously produces byproducts that are environmentally friendly and nonhazardous. The chief byproduct is water vapor.

Another embodiment of the present invention advantageously provides an environmentally friendly, energy efficient, and inexpensive process to make steel. The process eliminates the blast furnace and coke oven by direct conversion of iron-containing materials to iron carbide followed by the production of steel.

DETAILED DESCRIPTION

Figure 1:
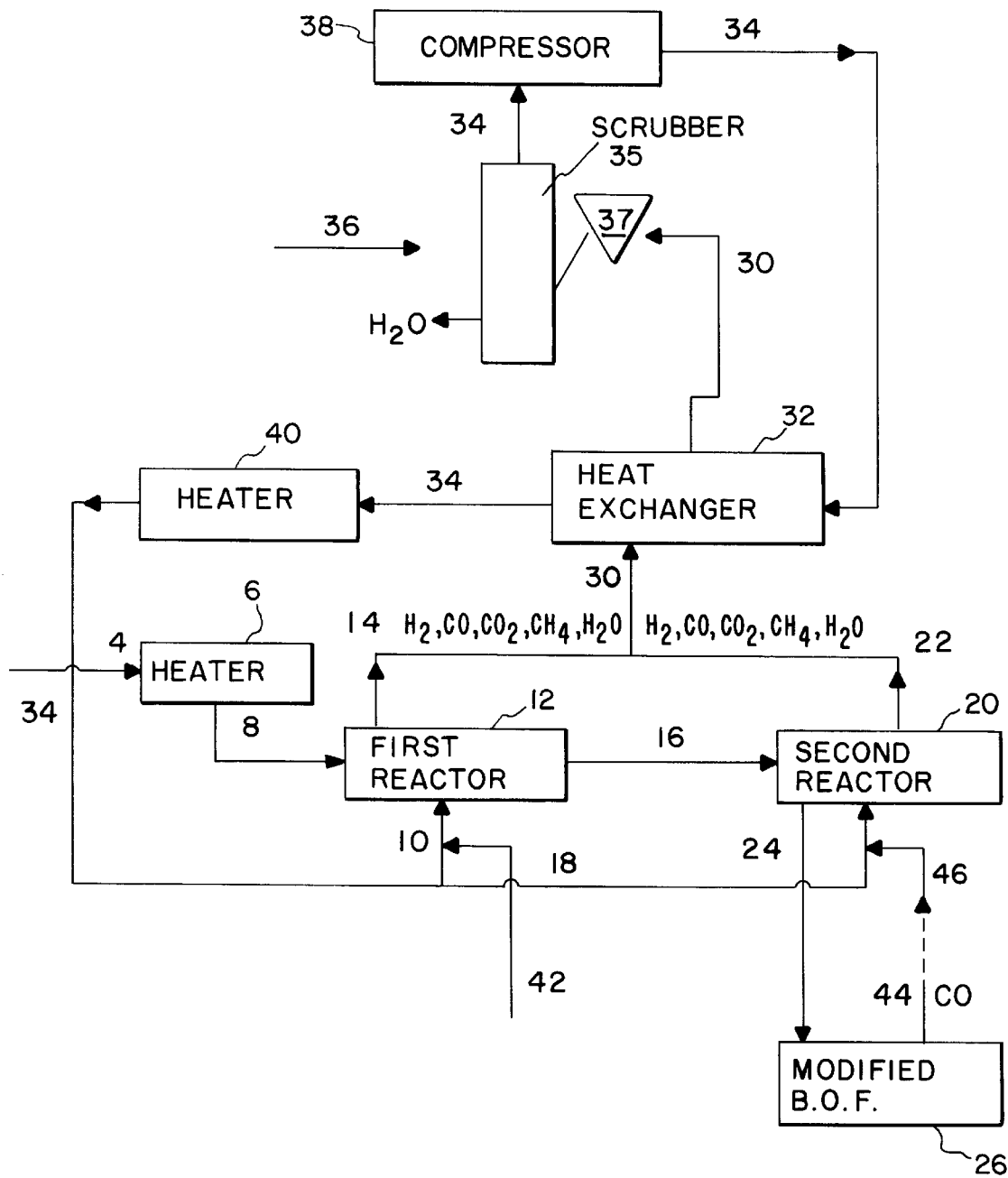
FIG. 1 is a flow schematic of an embodiment of the subject invention, illustrating the two step approach to convert an iron-containing feed material into an iron carbide-containing product.

Referring to FIG. 1, in one embodiment of the present invention, an iron material 4 can be heated in a heater 6 to produce a feed material 8. The iron material 4 can be selected from a wide range of iron-containing materials, including iron ores and iron ore concentrates. Preferably, the iron material 4 is one of or a mixture of several iron oxides, including magnetite ($Fe_3O_4$), hematite ($Fe_2O_3$), limonite ($Fe_2O_3.H_2O$), and geothite ($Fe_3O_4.H_2O$), and iron hydroxides, including $Fe(OH)_2$ and $Fe(OH)_3$. More preferably, the iron material 4 is a mixture of iron oxides and most preferably the iron material 4 contains at least about 90 mole percent iron oxides on a water free basis. In some applications, such as iron ores and iron ore concentrates, the iron material 4 can include small amounts of water.

In the heater 6, the iron material 4 is preferably heated in an oxidizing atmosphere to a temperature sufficient to oxidize iron oxide and other constituents of the iron material 4. This step increases iron carbide yield by converting magnetite into hematite and sulfide sulfur into sulfur dioxide gas or more stable sulfur compounds (e.g., thermally stable sulfates formed by the reaction of oxidized sulfide sulfur with alkali and alkaline earth oxides) and by removing or eliminating water as water vapor.

Conversion of the magnetite in the iron material 4 into hematite in the feed material 8 increases iron carbide yield, because hematite is more readily reduced to metallic iron in the first reactor 12 than magnetite. The feed material 8 contains preferably at least about 90, more preferably at least about 95, and most preferably at least about 98 mole percent iron oxides on a water free basis. After heating in the heater 6, the iron oxide constituent in the feed material 8 should contain preferably more than about 75, more preferably more than about 85, and most preferably more than about 95 mole percent hematite and preferably less than about 25, more preferably less than about 15, and most preferably less than about 5 mole percent magnetite. Preferably, at least about 50, more preferably at least about 75, and most preferably at least about 95 mole percent of the magnetite in the iron material 4 is converted into hematite in the heater 6.

Iron carbide yield is decreased by the presence of sulfide sulfur in the feed material 8, because sulfide sulfur retards the conversion of metallic iron to iron carbide. The feed material 8 should contain preferably less than about 2, more preferably less than about 1, and most preferably less than about 0.1 mole percent sulfide sulfur.

Iron carbide yield is decreased by the presence of water or water vapor, because water vapor, being a byproduct of the conversion of iron oxides into metallic iron and metallic iron into iron carbide, can impose equilibrium constraints on the production of metallic iron and iron carbide. The feed material 8 should have preferably less than about 5, more preferably less than about 2, and most preferably less than about 1 mole percent water.

The oxidizing atmosphere in the heater 6 can include any suitable oxidizing gas. Preferably, the oxidizing gas contains free oxygen, more preferably at least about 2 and most preferably at least about 5 percent by volume free oxygen.

The iron material 4 is preferably heated in the oxidizing atmosphere to a temperature from about 500° to about 800° C., more preferably from about 550° to about 700° C., and most preferably from about 600° to about 650° C.

The heater 6 can be any heated vessel that is capable of attaining the preferred temperatures. By way of example, the heater 6 can be any furnace or heating device, including a rotary kiln and a multiple hearth or shaft furnace.

The feed material 8 can be contacted with a first gas 10 in a first reactor 12 to produce a first reactor off-gas 14 and a first product 16. The first gas 10 should contain hydrogen to reduce the iron oxides and hydroxides in the feed material 8 to metallic iron. Preferably, the hydrogen is in the form of hydrogen gas, a hydrogen gas precursor, or a mixture thereof.

While not wishing to be bound by any theory, it is believed that hydrogen gas reduces iron oxides and hydroxides to metallic iron according to one or more of the following equations:

$$Fe_2O_3 + 3\ H_2 \rightarrow 2\ Fe + 3\ H_2O \quad (1)$$

$$Fe_3O_4 + 4\ H_2 \rightarrow 3\ Fe + 4\ H_2O \quad (2)$$

$$Fe(OH)_2 + H_2 \rightarrow Fe + 2\ H_2O \quad (3)$$

$$2\ Fe(OH)_3 + 3\ H_2 \rightarrow 2\ Fe + 6\ H_2O \quad (4)$$

As will be appreciated, carbon monoxide may also be used to reduce iron oxides and hydroxides to metallic iron. Carbon monoxide is not the preferred reducing agent because the carbon dioxide byproduct of the reduction reaction is difficult to remove from the first reactor off-gas 14 and free carbon can be deposited in the first product 16 by the reaction.

Figure 2:
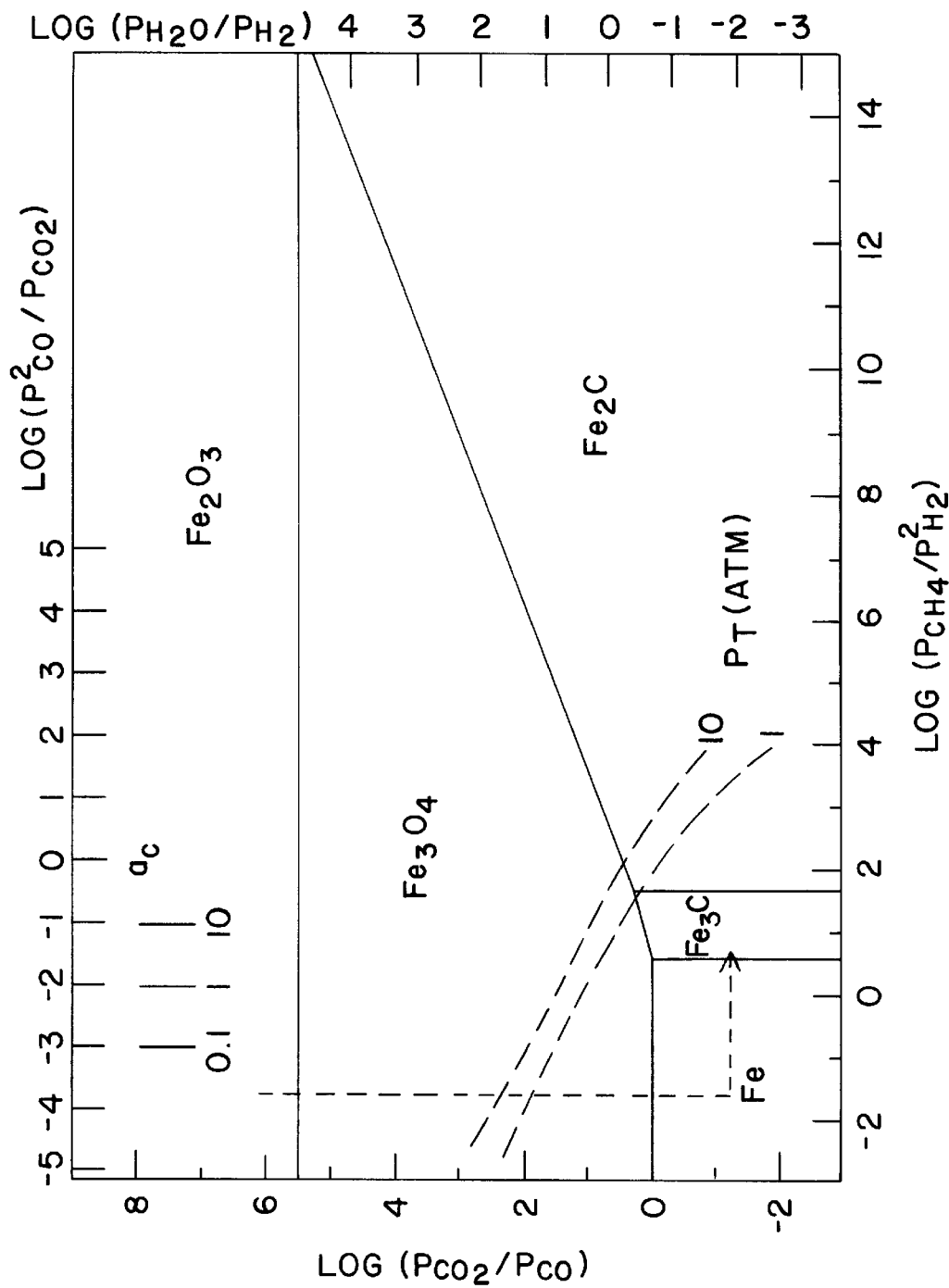
FIG. 2 is a graph showing the Fe—O—H—C stability at 800° K.

In one embodiment of the invention, the composition of the first gas 10 can be based on FIG. 2. FIG. 2 is a stability diagram representative of the iron-oxygen-hydrogen-carbon system as it relates to the formation of metallic iron and iron carbide at an operating temperature of about 800° K. in a five species gas system containing CO, $CO_2$, $H_2$, $CH_4$ and $H_2O$. As will be appreciated, the stability diagram will be altered if the operating temperature changes. Although the pressure of the gas impacts the composition of the first gas 10, it will not cause an alteration in the stability diagram. The stability diagram shows that by controlling the composition of the gaseous atmosphere and the operating temperature in the first reactor 12, it is possible to insure that metallic iron will be the end product.

Any point on the stability diagram corresponds to a unique gas composition in the five species gas system at a specific operating temperature and pressure. It is possible to translate the log coordinates at the point into the unique gas composition based on equilibrium constraints for the system as represented by the following equilibria:

$$CO + H_2O \rightarrow CO_2 + H_2 \quad (5)$$

$$CH_4 + H_2O \rightarrow CO + 3H_2 \quad (6)$$

As shown by the equilibria, the five species gas system is a Boulliard system. As will be appreciated, if a species in a Boulliard system is present in less than an equilibrium amount, the other components of the system will produce an equilibrium concentration of the species in the system. For example, if the system has less than an equilibrium concentration of methane, water and hydrogen on the one hand and carbon monoxide and carbon dioxide on the other will react to produce the needed amount of methane.

The amount of hydrogen gas and/or hydrogen gas precursor in the first gas 10 should at least be the amount corresponding to the operating point selected in the Fe portion of FIG. 2. The first gas 10 contains preferably at least about 30, and more preferably at least about 35 and most preferably at least about 45 mole percent hydrogen gas.

Preferably, the first gas 10 contains no more than those amounts of CO, $CO_2$, $CH_4$, and $H_2O$ corresponding to the selected point in the Fe portion of FIG. 2. As will be appreciated, concentrations of any one or more of these components in excess of the amounts shown in FIG. 2 will cause the selected point on the stability diagram to shift, which can lead to the production of undesired species, including magnetite and iron carbide. More preferably, the first gas 10 contains no more than about 40 and more preferably no more than about 30 mole percent reactive carbon.

Figure 3:
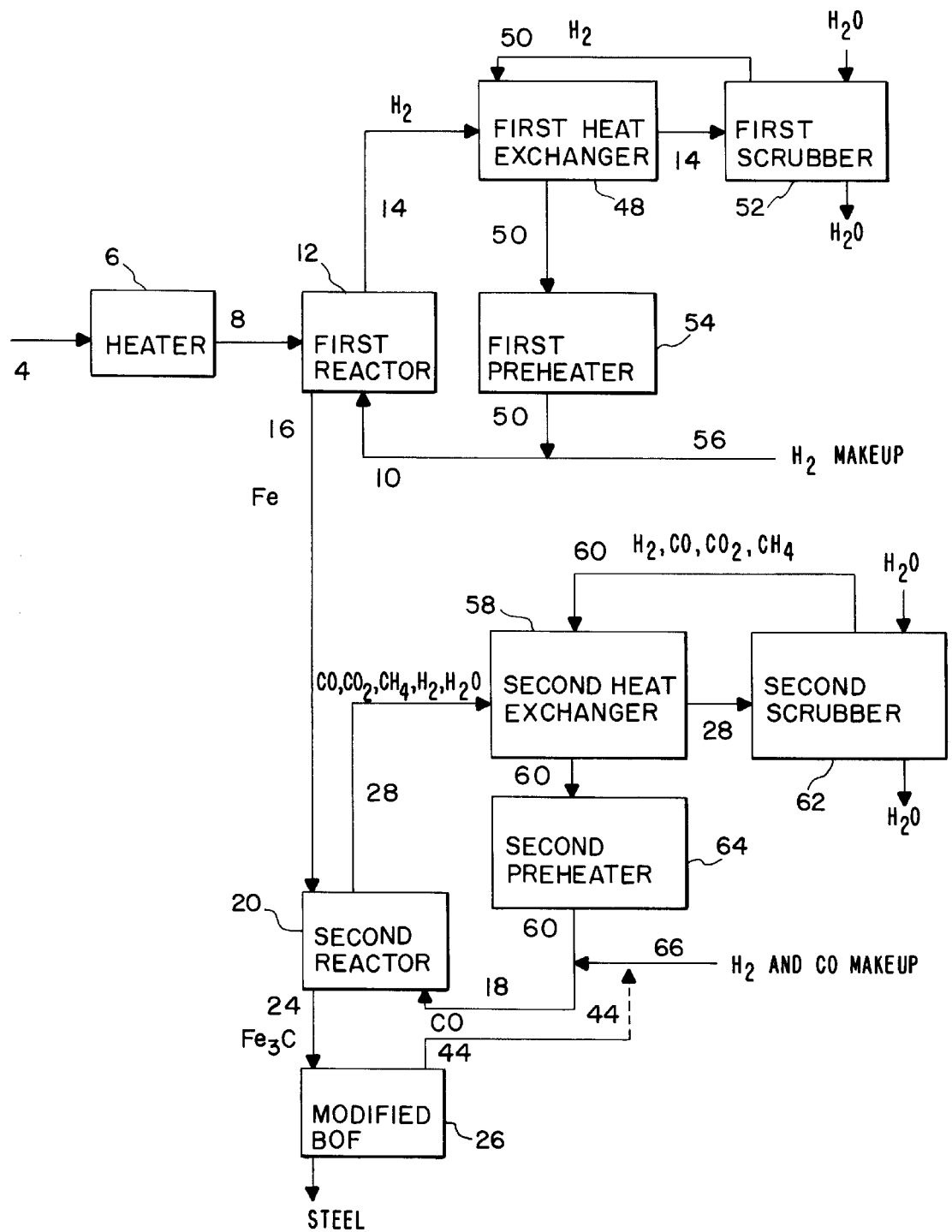
FIG. 3 is a flow schematic of another embodiment of the subject invention in which separate gas loops are used for the first and second reactors.

In another embodiment, shown in FIG. 3, the first gas 10 contains hydrogen gas, a hydrogen gas precursor or mixtures thereof and is substantially free of CO, $CO_2$ and $CH_4$. This embodiment is not a five species gas system as insufficient carbon is available to produce equilibrium concentrations of CO, $CO_2$ and $CH_4$.

It is preferred that at least about 70, more preferably at least about 80 and most preferably at least about 95 mole percent of the iron oxides in the feed material 8 be converted to metallic iron in the first reactor 12. The iron component in the first product 16 is preferably at least about 65, more preferably at least about 75, and most preferably at least about 90 mole percent metallic iron. The first product 16 contains preferably no more than about 35, more preferably no more than about 25, and most preferably no more than about 10 percent by weight iron carbide. Preferably, the first product 16 contains less than about 10 mole percent iron oxides. The presence of iron oxides in the first product 16 slows the reaction kinetics when the first product 16 is converted in a second reactor 20 to iron carbide.

The first reactor 12 can be selected from a variety of reactors, including a fluidized bed reactor, rotary kiln, or a multiple hearth or shaft furnace. For the feed material 8 having a median diameter of no more than about ¼ inches the preferred reactor is a fluidized bed reactor. For the feed material 8 having a median diameter of at least about ¼ inches, the preferred reactor is shaft furnace. Fluidized bed reactors, unlike shaft furnace reactors, have a uniform composition of the first gas 10 throughout the bed for finer particle sizes, which is an important factor to the yield and purity of the first product 16. The horizontal cross-section of the fluidized bed reactor can be of any desired geometrical configuration, such as rectangular or cylindrical.

For a fluidized bed reactor, the bed depth of the feed material 8 is preferably from about 1 to about 6 feet, more preferably from about 2 to about 4 feet, and most preferably about 3 feet. The size of the feed material 8 in the bed is preferably from about 0.05 mm to about 1.5 mm, more preferably from about 0.1 mm to about 1.5 mm, and most preferably from about 0.1 mm to about 1.0 mm.

During fluidization of the feed material 8 in the first reactor 12, the pressure of the first gas 10 above the fluidized bed is preferably from about 15 to about 80 psia, more preferably from about 20 to about 70 psia, and most preferably from about 30 to about 60 psia. The superficial velocity of the fluidizing first gas 10 is preferably from about 1.0 to about 4.0 feet/second, more preferably from about 1.0 to about 3.5 feet/second, and most preferably from about 1.5 to about 3.5 feet/second.

The temperature of the feed material 8 in the first reactor 12 should be sufficient to produce pyrophoric metallic iron. As will be appreciated, pyrophoric metallic iron is the preferred form for metallic iron, because the high reactivity of pyrophoric metallic iron increases reaction rates and decreases residence times. The temperature of the feed material 8 in the fluidized bed is preferably from about 400° to about 700° C., more preferably from about 500° to about 600° C., and most preferably from about 550° to about 600° C.

To efficiently convert the feed material 8 to metallic iron in a fluidized bed reactor, it is preferable that the feed material 8 remain in contact with the first gas 10 for a length of time sufficient to allow the diffusion controlled formation of metallic iron to proceed to completion. Preferably, the residence time is from about 10 to about 600 minutes, more preferably from about 30 to about 300 minutes, and most preferably from about 60 to about 300 minutes.

The first product 16 is transferred from the first reactor 12 to a second reactor 20 and contacted with a second gas 18 in the second reactor 20 to produce a second reactor off-gas 22 and a second product 24. The second gas 18 is a multiple component gas stream that carburizes the metallic iron in the first product 16 and converts it into iron carbide.

The second gas 18 preferably contains reactive carbon to carburize the metallic iron and hydrogen gas or a hydrogen gas precursor. In one embodiment of the present invention, it is preferred that the second gas 18 have concentrations of reactive carbon and hydrogen greater than the equilibrium concentrations in FIG. 2 to decrease the time required to convert the metallic iron to iron carbide.

The preferred reactive carbon is carbon monoxide or a carbon monoxide precursor, carbon dioxide or a carbon dioxide precursor or a mixture thereof. Based on FIG. 2, the equilibrium concentration of carbon monoxide is preferably from about 2 to about 10, more preferably from about 2 to about 8, and most preferably from about 2 to about 6 mole percent. The equilibrium concentration of carbon dioxide is preferably from about 1 to about 5, more preferably from about 1 to about 4, and most preferably from about 1 to about 3 mole percent.

In another embodiment of the present invention, the second gas 18 contains preferably no more than about 50, more preferably no more than about 45, and most preferably no more than about 40 mole percent carbon monoxide. The second gas 18 contains preferably no more than about 50, more preferably no more than about 45, and most preferably no more than about 40 mole percent carbon dioxide. As will be appreciated, the second reactor off-gas 22 can contain byproducts, including methane and water vapor.

While not wishing to be bound by any theory, it is believed that the second gas 18 converts metallic iron to iron carbide according to one or more of the following equations:

$$3\ Fe + CO + H_2 \rightarrow Fe_3C + H_2O \qquad (7)$$

$$3\ Fe + CO_2 + 2\ H_2 \rightarrow Fe_3C + 2\ H_2O \qquad (8)$$

$$2\ Fe + CO + H_2 \rightarrow Fe_2C + H_2O \qquad (9)$$

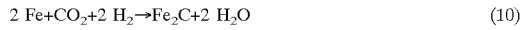

$$2\ Fe + CO_2 + 2\ H_2 \rightarrow Fe_2C + 2\ H_2O \qquad (10)$$

As can be seen from the foregoing equations, carbon monoxide and carbon dioxide are the primary sources of carbon for the conversion of metallic iron to iron carbide. It is preferred that the iron carbide in the second product 24 be at least about 90, more preferably at least about 92, and most preferably at least about 95 mole percent $Fe_3C$. Preferably, the iron carbide is less than about 1, more preferably less than about 0.5, and most preferably less than about 0.1 mole percent $Fe_2C$. $Fe_2C$, unlike $Fe_3C$, is highly reactive and will reoxidize upon exposure to air.

Removal of the oxygen in the carbon monoxide and carbon dioxide permits the carbon to be released for the formation of iron carbide. The oxygen in the carbon monoxide and/or carbon dioxide combines with the excess over the equilibrium amount of hydrogen gas in the second gas 18 and is converted into water.

The hydrogen gas and/or hydrogen gas precursor, such as water vapor, substantially reduces the deposition of free carbon on the iron carbide in the second product 24. In one embodiment of the present invention, the second gas 18 contains preferably up to about 50, more preferably up to about 40, and most preferably from up to about 30 mole percent hydrogen gas.

In another embodiment of the present invention, the equilibrium concentration of hydrogen in the second gas 18 given in FIG. 2 is the desired minimum concentration of hydrogen in the second gas 18. Based on FIG. 2, the equilibrium concentration of hydrogen gas in the second gas 18 is preferably from about 25 to about 40, more preferably from about 25 to about 35, and most preferably from about 30 to about 35 mole percent.

The free carbon results from the existence of carbon monoxide in the second gas 18 in an amount in excess of the equilibrium concentration of carbon monoxide in FIG. 2. While not wishing to be bound by any theory, it is believed that excess carbon monoxide decomposes into free carbon or reacts with hydrogen according to the following equations:

$$2\ CO \rightarrow CO_2 + C \qquad (11)$$

$$CO + H_2 \rightarrow H_2O + C \qquad (12)$$

and that the presence of hydrogen gas, hydrogen gas precursor, or mixtures thereof in the second gas 18 favors the following equation:

$$CO_2 + H_2 \rightarrow CO + H_2O \qquad (13)$$

As can be seen from these equations, the presence of water vapor, a hydrogen gas precursor, and carbon dioxide limit the decomposition of excess carbon monoxide into free carbon, and hydrogen gas converts excess carbon dioxide into carbon monoxide and water.

In another embodiment of the present invention, the second gas 18 contains methane or a methane precursor and water vapor. In this embodiment, the methane and water vapor can either be introduced externally into the system with the second gas 18 or internally into the system (if the system has a recycle gas loop) as byproducts of the carburization reaction. In this embodiment, the concentrations of the five components in second gas 18 will change over time. The methane concentration in the second gas 18 will increase to the equilibrium concentration corresponding to the selected point on FIG. 2.

The methane or methane precursor substantially reduces the decomposition of iron carbide. Based on FIG. 2, at equilibrium the second gas 18 preferably contains up to about 65, more preferably up to about 60, and most preferably up to about 55 mole percent methane.

The decomposition of iron carbide is caused by an imbalance of hydrogen activity to carbon activity in the second gas 18. While not wishing to be bound by any theory, it is believed that iron carbide can decompose into metallic iron according to the following equations:

$$Fe_3C + 2\ H_2 \rightarrow 3\ Fe + CH_4 \qquad (14)$$

$$Fe_2C + 2\ H_2 \rightarrow 2\ Fe + CH_4 \qquad (15)$$

The presence of methane or a methane precursor in the second gas 18 drives the equilibrium to the left, or to the formation of iron carbide. As will be appreciated, any metallic iron in the second product 24 would be pyrophoric and would readily oxidize. If the second product 24 were converted into steel, iron oxides would require excess energy input in the conversion.

Although methane and methane precursors contain carbon, it is preferred that methane or a methane precursor not be a source of carbon for carburization of the metallic iron. Using the carbon in the methane or methane precursor to form the iron carbide would produce hydrogen gas as shown by the back reactions in the above equations. The byproduct hydrogen gas would alter the composition of the second gas 18, causing the selected point on FIG. 2 to shift to the left. Excess hydrogen gas over the equilibrium amount is difficult to remove from a gas stream by scrubbing techniques.

The excess hydrogen gas would react with the iron carbide to reform metallic iron and methane, thereby producing impure iron carbide. With carbon monoxide or carbon dioxide as the carbon source, not only does the iron carbide contain fewer impurities but also water rather than hydrogen gas is the byproduct of the conversion of metallic iron to iron carbide. As will be appreciated, water vapor is easier to remove in the scrubber 36 than hydrogen gas.

Based on the foregoing, it will be appreciated that methane is a type of balance wheel in the present invention. If the 5-member gas requires additional hydrogen or carbon, the methane will react with other compounds to produce the needed material. If the system has too much hydrogen or carbon, methane will be formed.

The second gas 18 can also contain water vapor. The second gas 18 contains preferably no more than about 1.5, more preferably no more than about 1, and most preferably no more than about 0.5 percent by volume water vapor. As will be appreciated, the low concentration of water vapor in the second gas 18 drives the equilibrium in equations (7) through (10) to the right in favor of the formation of iron carbide and water.

The second product 24 is non-pyrophoric, contains a high percentage of iron, and has a high purity. The iron-containing materials in the second product 24 are preferably at least about 90, more preferably at least about 92, and most preferably at least about 95 mole percent iron carbide. The second product 24 preferably contains less than about 5 mole percent iron oxides, less than about 1 mole percent free carbon, and less than about 2 mole percent metallic iron.

The second reactor 20 can be selected from a wide variety of suitable reactors, including a fluidized bed reactor, rotary kiln, or a multiple hearth or shaft furnace. For a first product 16 having a median diameter of no more than about ¼ inch, the preferred reactor is a fluidized bed reactor. For a first product 16 having a median diameter of at least about ¼ inch, the preferred reactor is a shaft furnace. Fluidized bed reactors, unlike shaft furnace reactors, have a uniform composition of the second gas 18 throughout the bed for finer particle sizes, which is an important factor to the yield and purity of the second product 24. The horizontal cross-section of the fluidized bed reactor can be of any desired geometrical configuration, such as rectangular or cylindrical.

For a fluidized bed reactor as the second reactor 20, the bed depth is preferably from about 1 to about 6 feet, more preferably from about 2 to about 4 feet, and most preferably from about 3 feet. The median diameter size of the first product 16 in the bed is preferably between about 0.05 mm to about 1.5 mm, more preferably between about 0.1 mm to about 1.5 mm, and most preferably between about 0.1 mm to about 1 mm.

During fluidization of the first product 16 in the second reactor 20, the pressure of the second gas 18 above the fluidized bed is preferably from about 15 to about 90 psia, more preferably from about 15 to about 75 psia, and most preferably from about 30 to about 60 psia. The superficial velocity of the fluidizing second gas 18 is preferably from about 1.0 to about 4.0 feet/second, more preferably from about 1.0 to about 3.5 feet/second, and most preferably from about 1.5 to about 3.5 feet/second.

The temperature of the first product 16 in the fluidized bed is preferably from about 400° to about 600° C., more preferably from about 500° to about 600° C., and most preferably from about 550° to about 590° C.

To efficiently convert the first product 16 to iron carbide, it is preferable that the first product 16 remain in contact with the second gas 18 for a length of time sufficient to allow the diffusion controlled formation of iron carbide to proceed to completion. Preferably, the residence time is from about 30 to about 600 minutes, more preferably from about 60 to about 300 minutes, and most preferably from about 120 to about 300 minutes.

After a sufficient time in the second reactor 20, the second product 24 is removed. Preferably, at least about 90, more preferably at least about 94, and most preferably at least about 98 percent by weight of the metallic iron in first product 16 is converted into iron carbide in the second reactor 20.

The second product 24 can have a layer of hydrogen on its surface upon exiting the second reactor 20. Since catalytic combustion of the hydrogen can cause the material to become hot enough to oxidize, it is desirable to treat the second product 24 to remove the hydrogen layer. The second product 24 can, for example, be subjected to a flow of inert gas or placed in a vacuum to remove the hydrogen.

In the second reactor 20 and modified basic oxygen furnace 26, only a small amount of heat is required to make the process auto-thermal. As will be appreciated, the present invention has applications other than providing iron carbide for conversion into steel. For steel-making processes, the second product 24 comes out of the second reactor 20 at an elevated temperature from about 500° to about 600° C., more preferably from about 520° to about 590° C., and most preferably from about 550° to about 590° C. The second product 24 can be added directly to modified basic oxygen furnace at that temperature. Alternatively, the second product 24 can be heated to about 1200° C. to provide substantially all of the heat to make the process auto-thermal.

The first reactor off-gas 14, which has a temperature from about 500° to about 600° C., is combined with the second reactor off-gas 22 to form an off-gas 30. The off-gas 30 passes through a heat exchanger 32, which heats a recycled gas 34. From the heat exchanger 32, the off-gas 30 passes through a scrubber 36.

The scrubber 36 includes a venturi scrubber 37 to remove fine particles and some excess heat from the off-gas 30 and a packed tower section 35 where the off-gas 30 is run countercurrent to water at about 70° C. to condense water formed in the first and second reactors 12, 20 to form a recycled gas 34.

The recycled gas 34 passes through a suitable compressor 38 and then through the heat exchanger 32 where it is heated to about 400° C. by the off-gas 30. A portion of the recycled gas 34 can be bled off to control build up of undesired components. The recycled gas 34 is heated in the heater 40 to between about 550° and about 700° C.

The first gas 10 is a mixture of the recycled gas 34 and the first makeup gas 42. The amount of each of the recycled gas 34 and the first makeup gas 42 in the first gas 10 depends upon the composition of each gas and the desired composition of the first gas 10. After mixture of the two gases, the first gas 10 is delivered to the first reactor 12 at a temperature between about 550° and 700° C.

In one embodiment of the present invention, a furnace off-gas 44 from a modified basic oxygen furnace 26 can be channelled directly to the second make-up gas 46. Substantially all of the reactive carbon used in the second reactor 20 to convert metallic iron to iron carbide is recovered as carbon monoxide in the modified basic oxygen furnace 26 and recycled through the second reactor 20 to be reused for producing iron carbide.

Referring to FIG. 3, another embodiment of the present invention, an iron material 4 can be heated in a heater 6 to produce a feed material 8. The feed material 8 can be contacted with a first gas 10 in a first reactor 12 to produce a first reactor off-gas 14 and a first product 16. After a sufficient time in the first reactor 12, the first product 16 can be transferred to a second reactor 20.

The first reactor off-gas 14 is passed through a first heat exchanger 48, which heats a recycled first gas 50. From the first heat exchanger 48, the first reactor off-gas 14 passes through a first scrubber 52.

In the first scrubber 52, a venturi scrubber (not shown) is employed to remove fine particles and some excess heat in the first reactor off-gas 14. The first reactor off-gas 14 then moves to a packed tower section (not shown) of the first scrubber 52 where the first reactor off-gas 14 is run counter-current to water to condense water formed in the first reactor 12 and form the recycled first gas 50. The recycled first gas 50 passes through the first heat exchanger 48 where it is heated by the first reactor off-gas 14. A portion of the recycled first gas 50 can be bled off to control buildup of undesired components. The recycled first gas 50 is heated in a first preheater 54.

The first gas 10 is a mixture of the recycled first gas 50 and a first makeup gas 56. The amount of each of the recycled first gas 50 and the first makeup gas 56 in the first gas 10 depends upon the composition of each gas and the desired composition of the first gas 10. After mixture of the two gases, the first gas 10 is passed through a suitable compressor (not shown) and delivered to the first reactor 12.

The first product 16 is contacted with a second gas 18 in a second reactor 20 to produce a second reactor off-gas 28 and a second product 24. After a sufficient time in the second reactor 20, the second product 24 can be transferred to the modified basic oxygen furnace 26.

The second reactor off-gas 28, passes through a second heat exchanger 58, which heats a recycled second gas 60. From the second heat exchanger 58, the second reactor off-gas 28 passes through a second scrubber 62.

In the second scrubber 62, a venturi scrubber (not shown) is employed to remove fine particles and some excess heat in the second reactor off-gas 28. The second reactor off-gas 28 then moves to a packed tower section (not shown) of the second scrubber 62 where the second reactor off-gas 28 is run counter-current to water to condense water formed in the second reactor 20 to form the recycled second gas 60.

The recycled second gas 60 passes through the second heat exchanger 58 where it is heated by the second reactor off-gas 28. A portion of the recycled second gas 60 can be bled off to control build up of undesired components (e.g., nitrogen) in the recycled second gas 60. The recycled second gas 60 is heated in a second preheater 64.

The second gas 18 is a mixture of the recycled second gas 60 and a second makeup gas 66. The furnace off-gas 44 from the modified basic oxygen furnace 26 can be channelled directly to the second makeup gas 66 to supply a portion of the carbon monoxide in the second makeup gas 66. The amount of each of the recycled second gas 18 and the second makeup gas 66 in the second gas 18 depends upon the composition of each gas and the desired composition of the second gas 18. The second gas 18 is passed through a suitable compressor (not shown) and delivered to the second reactor 20.

EXAMPLES

Example 1

As an example of the effectiveness of the two step process for the production of iron carbide, a magnetite ore containing 69.8 percent iron and less than 2 percent gangue was first reduced to metallic iron in a laboratory fluidized bed reactor, using a fluidizing gas high in hydrogen as a reducing gas. The reactor has a recycle loop for the fluidizing gas similar to that shown in FIG. 1. When the sample had been substantially converted to metallic iron at a temperature of 500° C., a fluidizing gas containing carbon monoxide and carbon dioxide together with hydrogen gas was introduced into the system. As will be appreciated, the carbon in the carbon monoxide and carbon dioxide will react with a portion of the excess hydrogen to produce methane. As a result, an equilibrium amount of methane will be present in the recycled gas.

Within a few minutes after contact with the fluidizing gas the metallic iron began to be converted to iron carbide ($Fe_3C$) and after three hours the material in the fluidized bed reactor analyzed 97.5% $Fe_3C$, with less than 0.2% of FeO or $Fe_3O_4$ remaining in the product.

The analytical data for this test is presented in Tables 1–3 below. Table 1 presents the chemical composition of the magnetite ore.

TABLE 1

CHEMICAL COMPOSITION OF MAGNETITE ORE

| Component | Weight % |
|---|---|
| Fe | 69.8 |
| $SiO_2$ | 0.96 |
| $Al_2O_3$ | 0.83 |
| CaO | 0.007 |
| $P_2O_5$ | 0.119 |
| Mn | 0.007 |
| Mg | 0.002 |
| Ti | 0.080 |
| C | 0.07 |
| S | 0.041 |
| Other | 28.084 |

Table 2 provides the composition for samples taken from the product of the reactor.

TABLE 2

CHEMICAL COMPOSITION OF PRODUCT

| Component | Weight % |
|---|---|
| Fe | 87.0 |
| $SiO_2$ | 1.42 |
| $Al_2O_3$ | 0.60 |
| CaO | 0.16 |
| $P_2O_5$ | 0.140 |
| Mn | 0.014 |
| Mg | 0.004 |
| Ti | 0.109 |
| C | 8.24 |
| S | 0.014 |
| Other | 2.299 |

Table 3 provides the chemical compounds in the product based on a Mössbauer Analysis of the product.

TABLE 3

CHEMICAL COMPOSITION OF PRODUCT

| Component | Weight % |
|---|---|
| $Fe_3C$ (%) | 97.5 |
| $Fe_3O_4$ (%) | 0.2 |

TABLE 3-continued

CHEMICAL COMPOSITION OF PRODUCT

| Component | Weight % |
| --- | --- |
| Fe (%) | 0.0 |
| FeO (%) | 0.2 |
| Gangue (%) (assumed) | 2.0 |

Example 2

To demonstrate the differences in the fundamental reactions involved in the two stage process for the production of iron carbide compared to those involved in the single stage process described in U.S. Pat. No. 4,053,301, a test was run in which a high grade hematite ore was first reduced to metallic iron in a fluidized bed reactor at 500° C. for approximately 250 minutes.

The metallic iron was then fluidized with a gas having a composition from FIG. 2 that is suitable for the direct conversion of iron oxide to iron carbide. The gas composition is equivalent to the equilibrium gas composition at a selected point in the $Fe_3C$ portion of FIG. 2. At the selected point, the equilibrium gas composition was approximately 60% by volume methane and 20% by volume hydrogen with a trace amount of carbon monoxide and carbon dioxide present. The sample was contacted with the gas for 175 minutes during which time little or no iron carbide was formed.

At the end of 175 minutes, the gas composition was changed to provide a feed gas containing from about 5 to about 40% carbon monoxide, from about 3 to about 30% carbon dioxide and from about 20 to about 80% hydrogen. As noted above in the discussion of Example 1, methane was present in the recycled gas. The sample immediately began to show conversion from metallic iron to iron carbide. After 160 minutes the iron in the sample had been essentially completely converted to iron carbide, with no iron oxides and only 1.7% of metallic iron remaining in the sample. (See Table 5) No free carbon was present in the final sample, with the entire 6.5% of carbon being present as $Fe_3C$.

Figure 4:
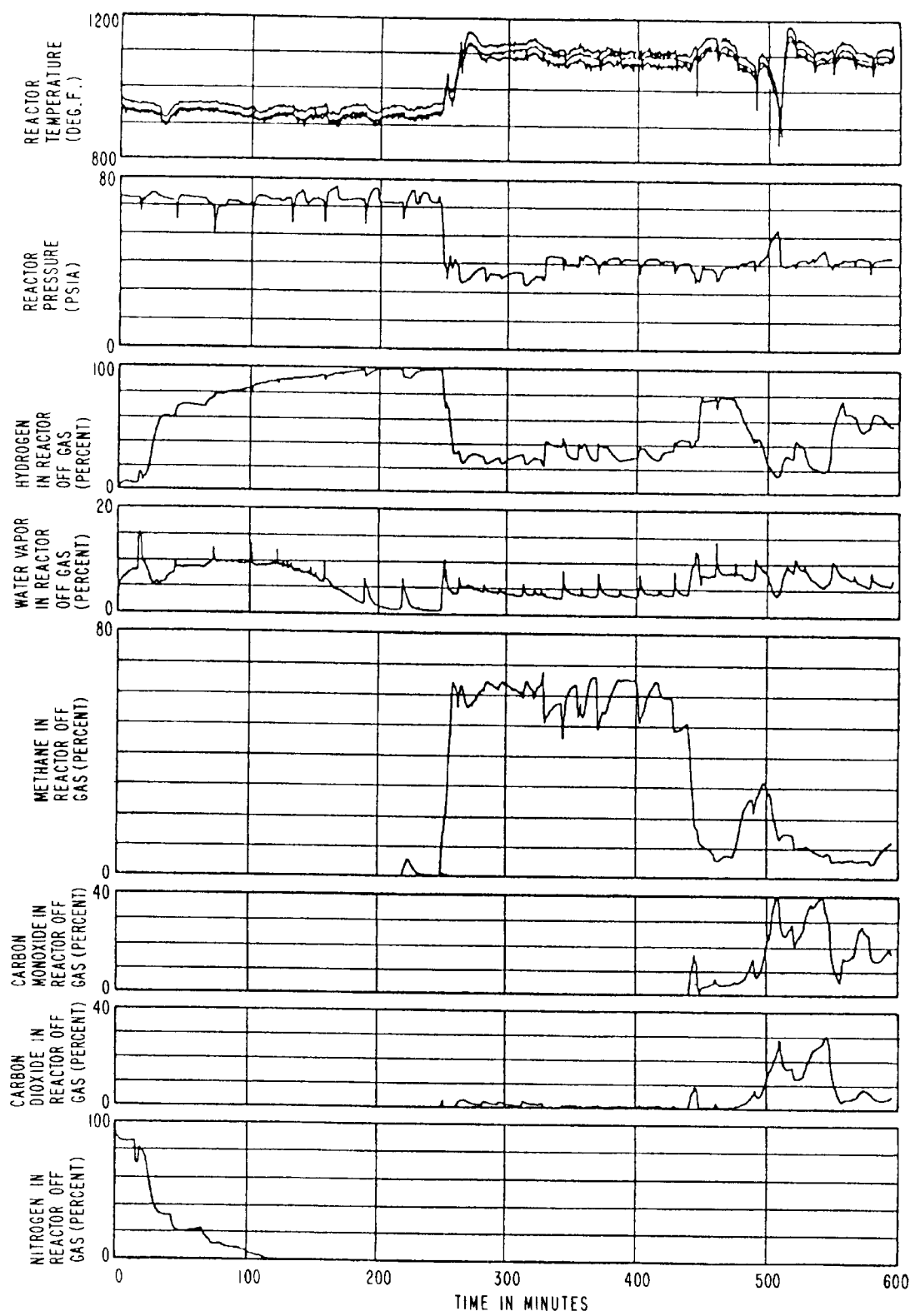
FIG. 4 depicts gas composition, pressure and temperature data for Example 2.

Analytical data for this test are given in Tables 4–6 below with the gas composition and temperature data for the test being shown graphically in FIG. 4. These data demonstrate that the conversion of metallic iron to iron carbide can easily be achieved using carbon monoxide or carbon dioxide as a carbon source. Unlike iron oxides in the single stage process, metallic iron is not readily converted to iron carbide using the reactive carbon in methane as a carbon source. While not wishing to be bound by any theory, it is believed that the absence of oxygen in the system retards the conversion of metallic iron to iron carbide by the single stage gas mixture. The absence of oxygen prevents the system from removing the excess hydrogen as water vapor. Water vapor is the only component of the gas being removed by a scrubber in the recycle gas loop. Accordingly, only enough metallic iron is converted to iron carbide to produce an equilibrium amount of hydrogen gas. In the single stage process, the iron is in the form of iron oxide (not metallic iron), which supplies sufficient oxygen when the iron oxide converts to iron carbide to permit the formation of water, thereby allowing methane to act as a carbon source.

Table 4 provides the chemical composition of the hematite ore sample. Table 5 provides the chemical compositions for the sample before a roasting step to oxidize magnetite in the sample into hematite, the sample after the roasting step, the sample after the reduction step, and the sample after the carburization step. In the carburization step, the gas containing carbon monoxide, carbon dioxide and hydrogen was contacted with the sample for about 160 minutes, after carburization was attempted using the single stage gas mixture. Table 6, in contrast, provides the compositions of the feed material before reduction ("Feed"), after reduction ("Reduced Fe"), after attempted carburization using the single stage gas mixture ("Single Stage Gas Mix") and using the same carbon monoxide, carbon dioxide and hydrogen gas mixture referred to above in reference to Table 5 ("$CO+CO_2+H_2$"). The final composition of the sample (when the experiment was terminated after a total elapsed time of 585 minutes) is provided in Table 5 (See "Final Bed").

TABLE 4

CHEMICAL COMPOSITION ANALYSIS OF PRODUCT
Iron Ore Sample

| Component | Weight % |
| --- | --- |
| Fe | 66.94 |
| $SiO_2$ | 1.10 |
| $Al_2O_3$ | 0.68 |
| P | 0.083 |
| Mn | 0.007 |
| CaO | 0.570 |
| MgO | 0.029 |
| $TiO_2$ | 0.038 |
| S | 0.029 |
| Cu | 0.005 |
| Ni | 0.003 |
| Cr | N.A. |
| C | 0.04 |
| Other | 30.476 |

TABLE 5

CHEMICAL COMPOSITION OF SAMPLE USING MÖSSBAUER AND CARBON ANALYSIS TECHNIQUES

| | $Fe_3C$ wt % | Fe wt % | $Fe_3O_4$ wt % | FeO wt % | $Fe_2O_3$ wt % | Gangue wt % | Carbon wt % |
| --- | --- | --- | --- | --- | --- | --- | --- |
| Head (before roast) | 0.0 | 1.8 | 37.6 | 0.0 | 58.0 | 2.6 | 0.04 |
| Head (after roast) | 0.8 | 1.4 | 23.3 | 1.4 | 70.5 | 2.6 | 0.02 |
| Bed (after reduction) | 0.0 | 92.3 | 0.8 | 3.9 | N.A. | 3.0 | N.A |
| Final bed | 95.3 | 1.7 | 0.0 | 0.0 | N.A. | 3.0 | 6.50 |

TABLE 6

CHEMICAL COMPOSITION OF SAMPLE USING MÖSSBAUER AND CARBON ANALYSIS TECHNIQUES

| Material | Time Minutes | Fe wt % | $Fe_3C$ wt % | $Fe_3O_4$ wt % | $Fe_2O_3$ wt % | FeO wt % | Gangue wt % |
| --- | --- | --- | --- | --- | --- | --- | --- |
| Feed | 0 | 0.5 | 1.3 | 21.0 | 74.7 | 0 | 2.6 |
| Reduced Fe | 0–250 | 95.9 | 0.3 | 0.4 | 0 | 0.7 | 2.6 |
| Single Stage Gas Mix | 250–425 | 73.9 | 8.1 | 14.2 | 0 | 1.2 | 2.6 |
| $CO + CO_2 + H_2$ | 425–500 | 25.5 | 58.8 | 10.4 | 0 | 2.6 | 2.6 |
| $CO + CO_2 + H_2$ | 500–575 | 2.1 | 93.0 | 1.7 | 0 | 0.5 | 2.6 |

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for producing iron carbide, comprising the steps of:
    (a) first contacting a feed material comprising iron with a first gas comprising hydrogen and carbon to produce a first product comprising metallic iron, wherein said first product contains no more than about 35 percent by weight iron carbide; and
    (b) second contacting said first product with a second gas to produce a second product comprising iron carbide, wherein said second gas comprises (i) a first component selected from the group consisting of carbon monoxide, carbon dioxide and mixtures thereof to provide a carbon source to convert said first product into iron carbide; (ii) a second component comprising hydrogen gas to inhibit the formation of free carbon in said second product; and (iii) a third component comprising methane to inhibit the back conversion of said iron carbide into metallic iron.

2. The method, as claimed in claim 1, wherein said first and second contacting steps are conducted in separate reaction zones.

3. The method, as claimed in claim 1, wherein said first contacting step comprises fluidizing a bed of said feed material with said first gas, and said second contacting step comprises fluidizing a bed of said first product with said second gas.

4. The method, as claimed in claim 1, wherein said first component is the primary source of carbon in the conversion of said first product to iron carbide.

5. The method, as claimed in claim 1, wherein said feed material comprises magnetite and hematite.

6. The method, as claimed in claim 1, further comprising heating said feed material in an oxidizing atmosphere before said first contacting step to a temperature sufficient to oxidize the feed material.

7. The method, as claimed in claim 1, wherein said feed material comprises less than about 4 mole percent water.

8. The method, as claimed in claim 1, wherein a primary byproduct of the production of iron carbide is water.

9. The method, as claimed in claim 1, wherein at least about 90 mole percent of said feed material is iron oxide on a water free basis.

10. The method, as claimed in claim 1, wherein at least about 70 mole percent of said feed material is converted into metallic iron in said first contacting step.

11. The method, as claimed in claim 1, wherein at least about 65 mole percent of said first product is metallic iron.

12. The method, as claimed in claim 1, wherein said first product comprises pyrophoric metallic iron.

13. The method, as claimed in claim 1, wherein said hydrogen in said first gas comprises hydrogen gas.

14. The method, as claimed in claim 13, wherein said first gas comprises at least about 30 mole percent hydrogen gas.

15. The method, as claimed in claim 1, wherein the temperature of said first product in said second contacting step ranges from about 400° to about 600° C.

16. The method, as claimed in claim 1, wherein at least about 65 mole percent of said metallic iron is converted into iron carbide in said second contacting step.

17. The method, as claimed in claim 1, wherein said first gas comprises no more than an equilibrium concentration of a compound selected from the group consisting of carbon monoxide, carbon dioxide, and methane.

18. The method, as claimed in claim 1, wherein said second gas comprises no more than an equilibrium concentration of methane.

19. The method, as claimed in claim 1, wherein at least about 90 mole percent of said second product is iron carbide.

20. The method, as claimed in claim 19, wherein said second product contains no more than about 10 mole percent impurities.

21. The method, as claimed in claim 1, further comprising:
    (c) converting said second product into steel.

22. A method for converting iron oxide into iron carbide, comprising the steps of:
    (a) contacting in a first reaction zone an iron oxide-containing feed material with a first gas comprising hydrogen gas and carbon to convert said iron oxide-containing feed material into a metallic iron-containing product; and
    (b) contacting in a second reaction zone said metallic iron-containing product with a second gas to form an iron carbide-containing product, wherein said second gas comprises: (i) a component selected from the group consisting of carbon monoxide, carbon dioxide, and mixtures thereof to provide a source of carbon in the formation of iron carbide and (ii) methane to inhibit the back conversion of iron carbide into metallic iron.

23. The method, as claimed in claim 22, wherein the temperature of said metallic iron-containing product in step (b) ranges from about 500° to about 600° C.

24. The method, as claimed in claim 22, wherein said iron oxide is at least about 75 mole percent hematite.

25. The method, as claimed in claim 22, wherein said iron oxide-containing feed material comprises at least 90 mole percent iron oxide and at least 70 mole percent of said iron oxide is converted into metallic iron in step (a).

26. The method, as claimed in claim 22, wherein said metallic iron-containing product comprises at least about 65 mole percent metallic iron.

27. The method, as claimed in claim 22, wherein said second gas comprises between about 1 and 50 mole percent of said component.

28. The method, as claimed in claim 22, wherein said iron carbide-containing product comprises less than about 1 mole percent free carbon.

29. The method, as claimed in claim 22, wherein said second gas further comprises between about 25 and 50 mole percent of hydrogen gas.

30. The method, as claimed in claim 22, wherein said second gas comprises up to about 65 mole percent of methane.

31. The method, as claimed in claim 22, wherein at least 90 mole percent of said iron carbide is $Fe_3C$.

32. The method, as claimed in claim 1, wherein said second gas comprises more than an equilibrium concentration of hydrogen gas.

33. The method, as claimed in claim 1, wherein less than about 1 mole percent of said second product is free carbon.

34. The method, as claimed in claim 1, wherein less than about 5 mole percent of said second product is iron oxide.

35. The method, as claimed in claim 1, wherein at least about 90 mole percent of said second product is iron carbide and said iron carbide is in the form $Fe_3C$.

36. The method, as claimed in claim 1, wherein said second gas comprises more than an equilibrium concentration of said first component.

37. The method, as claimed in claim 1, wherein said first gas comprises more than an equilibrium concentration of hydrogen gas.

38. The method, as claimed in claim 22, wherein said second gas further comprises hydrogen gas to inhibit the formation of free carbon in said iron-carbide containing product.

39. A method for producing iron carbide, comprising the steps of:
(a) first contacting an iron-containing feed material with a first gas comprising hydrogen and carbon to produce a first product comprising metallic iron, wherein said first product contains no more than about 35 percent by weight iron carbide; and
(b) second contacting said first product with a second gas to produce a second product comprising iron carbide, wherein said second gas comprises (i) a component selected from the group consisting of carbon monoxide, carbon dioxide, and mixtures thereof to provide a carbon source for the conversion of said first product into iron carbide; and (ii) hydrogen gas to inhibit the formation of free carbon in said second product.

* * * * *

UNITED STATES PATENT AND TRADEMARK OFFICE
CERTIFICATE OF CORRECTION

PATENT NO. : 5,869,018
DATED : February 9, 1999
INVENTOR(S) : Stephens, Jr.

It is certified that error appears in the above-identified patent and that said Letters Patent is hereby corrected as shown below:

On the title page,
item [57] , please delete "in" and insert -- invention is --.

Signed and Sealed this

Twenty-ninth Day of June, 1999

Attest:

Q. TODD DICKINSON

Attesting Officer

Acting Commissioner of Patents and Trademarks